United States Patent [19]

Kobayashi et al.

[11] 4,009,069
[45] Feb. 22, 1977

[54] METHOD AND APPARATUS FOR PRODUCING SYNTHETIC RESIN TUBE

[75] Inventors: Mikio Kobayashi, Takatsuki; Isamu Nakano, Toyonaka, both of Japan

[73] Assignee: Sekisui Kagaku Kogyo Kabushiki Kaisha, Osaka, Japan

[22] Filed: Jan. 27, 1975

[21] Appl. No.: 544,665

[30] Foreign Application Priority Data

Jan. 28, 1974 Japan .............................. 49-12089
Apr. 16, 1974 Japan .............................. 49-42871

[52] U.S. Cl. .............................. 156/466; 156/203; 156/498; 156/499
[51] Int. Cl.² .............................. B29D 23/10
[58] Field of Search .......... 156/203, 466, 498, 499, 156/200–202, 467, 443; 93/82; 228/147, 151

[56] References Cited
UNITED STATES PATENTS

| | | | |
|---|---|---|---|
| 2,049,756 | 8/1936 | Asmussen et al. .................... | 93/82 |
| 2,989,113 | 6/1961 | Jarund .............................. | 156/466 |
| 3,024,496 | 3/1962 | Colombo ........................ | 156/244 X |
| 3,388,017 | 6/1968 | Grimsley et al. .................. | 156/498 |
| 3,650,868 | 3/1972 | Murota ........................... | 156/466 X |
| 3,758,364 | 9/1973 | Edelman ........................ | 156/467 X |
| 3,834,969 | 9/1974 | Doll .................................. | 156/466 |

FOREIGN PATENTS OR APPLICATIONS 1,311,341 10/1962 France .............................. 156/466

*Primary Examiner*—David A. Simmons
*Attorney, Agent, or Firm*—Edwin E. Greigg

[57] ABSTRACT

Method and apparatus for producing a synthetic resin tube by deforming a strip of synthetic resin and joining both laterally disposed edges of the deformed strip together while transporting the strip in its longitudinal direction.

18 Claims, 8 Drawing Figures

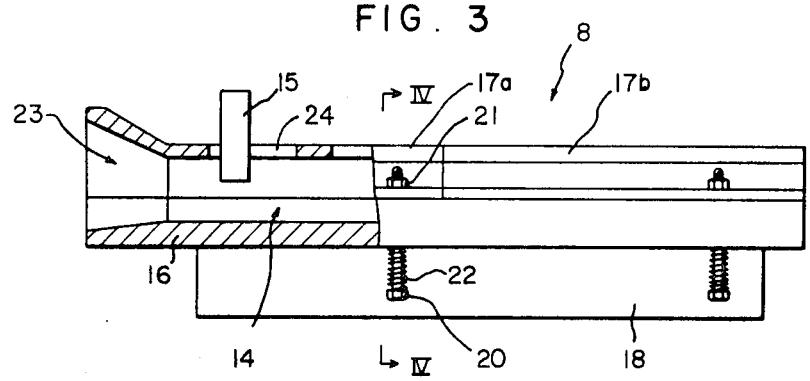
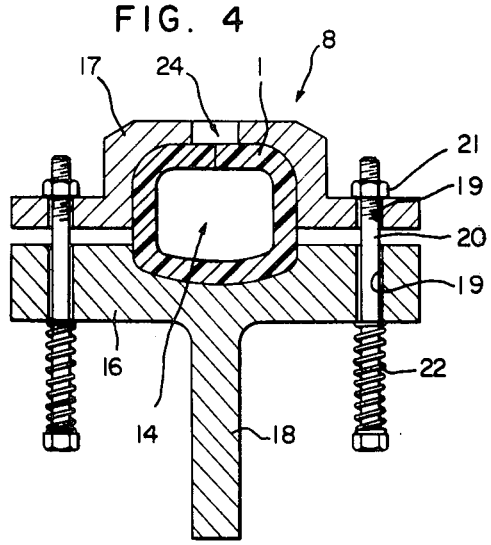
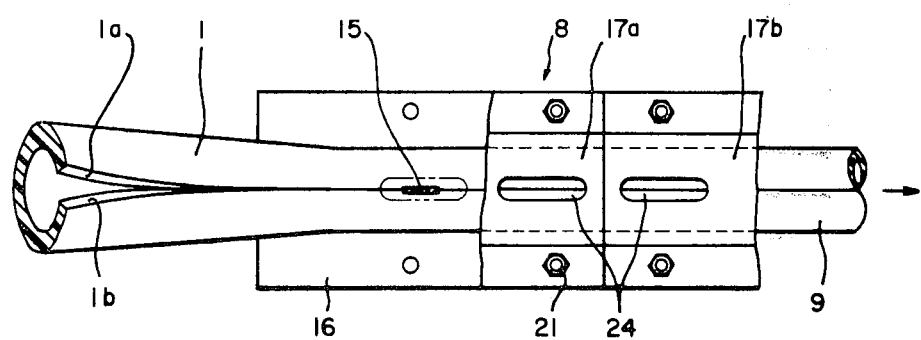

METHOD AND APPARATUS FOR PRODUCING SYNTHETIC RESIN TUBE

BACKGROUND OF THE INVENTION

The present invention relates to improvements in an apparatus for producing synthetic resin tubes by deforming a strip of synthetic resin into a tubular shape having an axis extending longitudinally of the strip and joining both lateral edges of the strip together while transporting the strip in its longitudinal direction.

Conventionally, a planar strip is deformed into a tubular shape by passing the strip through a first space having a gradually reducing width or peripheral length and subsequently sending the strip into a second space having a peripheral length substantially equal to the outer peripheral length of the tube to be obtained. With the conventional apparatus, however, the peripheral length of the second space is invariable, while the transverse dimension of a strip generally varies in its longitudinal direction. Consequently, where the strip has a greater width than is specified, the strip is subjected to higher resistance while travelling through the second space axially thereof, with the result that the pulling force to pass the strip through the second space stretches the strip, thereby varying the wall thickness of the resulting tube in its longitudinal direction. The increased resistance sometimes gives rise to such an accident that the strip is ruptured or becomes incapable of passing through the second space. Conversely, where the width of strip is smaller than the specified dimension, the strip passes through the second space with its side edges unjoined with each other. Thus it becomes impossible to obtain a tube or to bring the lateral edges into pressing contact with each other under high pressure to form a joint of sufficient strength.

This invention intends to overcome these problems heretofore experienced in the manufacture of synthetic resin tubes.

SUMMARY OF THE INVENTION

The method for producing a synthetic resin tube according to this invention comprises the steps of transporting a strip of synthetic resin in its longitudinal direction, deforming the strip into a tubular shape having an axis extending in the longitudinal direction of the strip and at the same time bringing both lateral edges of the strip into pressing contact with each other to join said edges while passing the strip through a restricted space during transport, and is characterized in that the diameter of the restricted space is adjustable in accordance with the variation of the transverse dimension of the strip in its longitudinal direction by utilizing the internal stress of the strip passing therethrough.

The apparatus for producing a synthetic resin tube according to this invention comprises feed means for transporting a strip of synthetic resin in its longitudinal direction, means for rendering a lateral edges of the strip adhesive during transport, means defining a restricted space for passing the strip therethrough during transport so that the restricted space deforms the strip into a tubular shape having an axis extending in the longitudinal direction of the strip and brings both lateral edges of the strip into pressing contact with each other to join said edges, the apparatus being characterized in that the means defining the restricted space has a plurality of pressing members arranged along the peripery of the restricted space, at least some of which are movable relative to each other diametrically of the space. The movable member may then be toward supporting members so that the diameter of the restricted space reduces.

Thus the diameter of the restricted space is automatically adjustable to the variation of the transverse dimension of the strip in its longitudinal direction, and the movable pressing member is always so urged as to reduce the diameter. This construction permits the strip to smoothly pass through the restricted space all the time irrespective of its transverse dimension and assures that the laterally disposed edges of the strip will be effectively brought into contact with each other. When the urging force acting to reduce the diameter of the restricted space is determined suitably in accordance with the material and/or dimensions of the strip, a contact pressure suitable for joining the lateral edges can be constantly maintained. In sum, the present apparatus is capable of reliably and continuously producing a synthetic resin tube which has a substantially uniform wall thickness and a strong joint, without such disadvantages as interruption of the transport operation and rupture of the strip.

The primary object of this invention is to provide an apparatus in which, when a strip is deformed into a tubular shape and the lateral edges of the strip are joined by being passed through a restricted space, the strip can be passed through the space without being subjected to axial resistance which may otherwise be produced due to variations in the transverse dimension of the strip, and the pressure of contact between the lateral surfaces is maintained at a substantially constant level so as to produce a tube free from variations in the wall thickness and defects in the joint with a trouble-free transport operation.

Another object of this invention is to provide an apparatus which is suitable for continuously producing a large quantity of synthetic resin tube from a strip of resin material.

Still another object of this invention is to provide an apparatus especially suitable for producing heat-insulating tube for pipes.

Other objects and advantages of this invention will become more apparent from the following description.

BRIEF DESCRIPTION OF THE DRAWINGS

FIG. 3 is a side elevation partly broken away showing part of the restricted space defining means;

FIG. 4 is a view in section taken along the line IV-13 IV in FIG. 3;

FIG. 5 is a planar view partly broken away showing the restricted space defining means;

DESCRIPTION OF THE PREFERRED EMBODIMENTS

Figure 1:
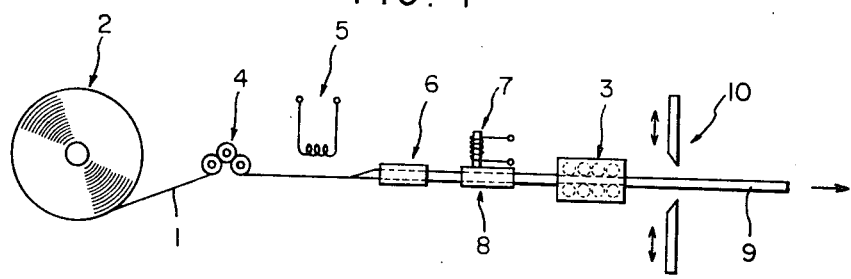
FIG. 1 is a flow sheet showing an apparatus in its entirety.
Figure 2:
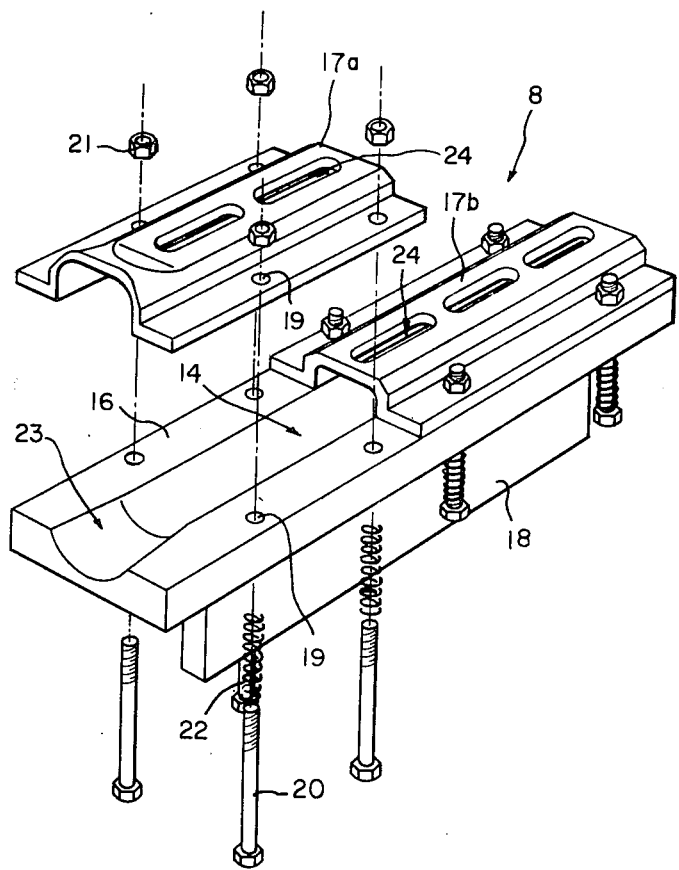
FIG. 2 is a partly exploded perspective view showing means defining a restricted space.

With reference to FIG. 1, a strip 1 of thermoplastic synthetic resin is preferably continuously pulled out in its longitudinal direction from a roll 2 of the strip by rotating pinch rollers 3. Guide rollers 4 disposed close to the roll 2 prevent the strip 1 from creasing and maintain the strip 1 under regulated tension. Positioned between the guide rollers 4 and the pinch rollers 3 is heating of element 5 for heating the strip 1 to such a state that the strip 1 may then be shaped to such a degree that it will not return to its original shape when an external deforming force is removed after it has been curved. It is to be understood that the strip will be subjected to heat treatment above the softening temperature thereof, immediately prior to entry into the deforming means 6 which will curve the strip 1 about an axis extending in its longitudinal direction, whereupon it enters the means 7 for rendering the laterally disposed edges of the strip 1 adhesive, said last named means being combined with means 8 which defines a restricted space through which the strip 1 passes during its treatment and formation into a tube. These means are arranged in the above-mentioned order in the direction of the transport of the strip 1. A cutter 10 for severing a tube 9 to predetermined lengths is positioned behind the assembly of pinch rollers 3.

In view of the foregoing, it will be understood that initially the strip, pulled from the roll 2 is then heated as explained by the element 5 on at least one side is, thereafter shaped to an approximate tubular form by the curving means 6 and finally rendered adhesive at one or both of its lateral edges by the means 7. Subsequently, the means 8 deforms the strip to a completely tubular shape, bringing the lateral edges into pressing contact with each other to conjoin them, and then to shape the strip to a specified form while cooling the same with air. The resultant tube 9 then obtained by this invention is severed by the cutter 10 in suitable lengths for use. The tube obtained is given a property to permanently maintain the tubular shape through heating thereof by element 5. Subsequently this tube may be used as a cover for pipes, for example, the tubular shape being maintained by reason of the steps narrated when the tube 9 is cut apart in the axial direction, thereby facilitating the coverage of the pipes much easier.

Examples of the thermoplastic synthetic resins to be used in this invention are varied and include polyethylene, polystyrene, polyamide. Especially preferable are relatively thick foamed resin materials for producing heat insulators for use with pipes.

The feed means for transporting the strip 1 in its longitudinal direction may be different from the foregoing embodiment; for example, the strip 1 may be bent in a zigzag manner and then pulled out by pinch rollers.

The heating element 5, curving means 6 and means 7 for imparting adhering properties to the lateral edge or edges of the strip 1 can be arranged in a different order as desired, and the heating element 5 and/or the curving means 6 can be omitted for reasons which will be explained later herein. When there is no need to sever the tube 9, a winding means may be provided for taking up the tube 9 in place of the cutter 10.

Figure 6:
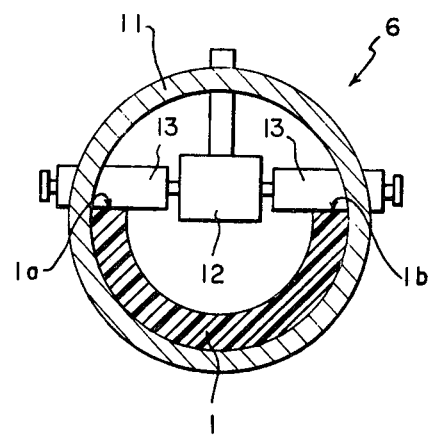
FIG. 6 is a view in cross section showing curving means.

As shown in FIG. 6, the curving means 6 comprises a pipe 11, a bearing 12 disposed within the pipe 11 preferably in a vertically shiftable manner and at least one pair of guide rollers 13 supported by the bearing 12. The strip 1 slides on the inner surface of the pipe 11, with its oppositely disposed lateral edges 1a and 1b in contact with the guide rollers 13 respectively, and is thereby deformed into a substantially trough-like shape as shown in section. This assures that the strip 1 will be deformed into a specified shape in the restricted space. The strip 1 can be deformed by the curving means 6 into an desired shape.

Usable as a heating element 5 are various types of devices such as a heated nichrome wire or infrared lamp or a combustion type employing a burner. The strip 1 is heated either on its opposite sides or on only one side thereof.

FIGS. 3 and 5 show the means 7 for imparting adhereing properties to the lateral surfaces 1a and 1b of the strip 1 which includes a heater plate 15 inserted into the restricted space 14 close to its inlet and fixed to a suitable support member (not shown). When brought into sliding contact with the heater plate 15, the lateral surfaces 1a and 1b of the strip 1 are heated to a sufficiently high temperature to fuse to each other. The heater plate 15 is heated by an unillustrated heating element of the well-known electric resistance type such as a nichrome wire which is wound around or embodied in the plate 15. The heater plate 15 may be adapted to contact only one of the lateral surfaces 1a and 1b of the strip if desired. Alernatively the heater plate 15 is replaceable by a roll or the like for applying an adhesive to at least one of the lateral surface 1a and 1b of the strip 1.

FIGS. 2, 3, 4 and 5 show the restricted space defining means 8 comprising a stationary member 16 surrounding approximately the lower half of the restricted space 14 and movable members 17a and 17b surrounding approximately the upper half of the restricted space 14. This entire structure is supported by a leg member 18 which is affixed to a suitable frame (not shown). The movable members 17a and 17b, aligned longitudinally of the restricted space, are mounted on the stationary member 16 with bolts 20 passed through bores 19 in the stationary and movable members 16, 17a and 17b, nuts 21 screwed on the bolts 20 and springs 22 provided between the heads of bolts 20 and the stationary member 16, each of the movable members 17a and 17b are spring loaded and thus vertically movable. The movable members 17a and 17b are urged by the force of gravity toward the stationary member 16, namely in a downward direction so as to reduce the diameter of the restricted space 14. Furthermore, when the movable members 17a and 17b are raised in accordance with the variation of the transverse dimension of the strip 1 in its longitudinal direction while the strip 1 passes through the restricted space 14 and by the action of internal stress of the strip 1, the springs 22 act to urge the movable members 17a and 17b toward the stationary member 16, the member 17a on the inlet side of the restricted space 14 is urged with a greater force than the other member 17b on the outlet side. Consequently, the strip 1 passing through the restricted space 14 is deformed into a completly closed tubular shape, with the opposite lateral edges 1a and 1b of the strip brought into pressing contact with each other and thereby conjoined. The diameter of the restricting space 14 changes in conformity with the variation in the transverse dimension of the strip 1 in order to diminish the variance in tension on the strip 1. The movement of the nuts 21 relative to the bolts 20 will control the biasing force on the movable members 17a and 17b in conformity with the type of material used or the dimensions of the strip 1. The inlet of the restricted space 14 communicates with a funnel-shaped mouth 23, which permits the strip 1 to enter the restricted space 14 smoothly. The movable members 17a and 17b have a plurality of slots 24 arranged longitudinally of the restricted space in alignment with the fused portion of the tube so that the strip 1, especially the fused portion thereof, can be cooled with air. Thus the tube 9 of a complete and specified shape is emitted from the restricted space 14. The inner surfaces of the top portions of the movable members 17a and 17b, namely the inner surfaces of said members juxtaposed to portions of the strip 1 adjacent to the lateral edges 1a and 1b, are formed planar so that the lateral edges 1a and 1b may be brought into pressing contact over the lenear extent thereof, such that a groove is formed at the joint to prevent undesirable disfiguration of the tube.

The stationary and movable members 16, 17a and 17b may be replaced by at least three members arranged along the periphery of the restricted space 14 and moveable relative to each other diametrically of the space 14. These members are herein generally referred to as pressing members 16 and 17.

The springs 22 may be replaced by other springs exerting on the movable pressing member 17 an opposing force less than that of gravity the to control the force exerted on the strip 1. Conveniently, means such as the aforesaid bolts 20 and nuts 21 is provided to control the opposing force of the springs.

Figure 7:
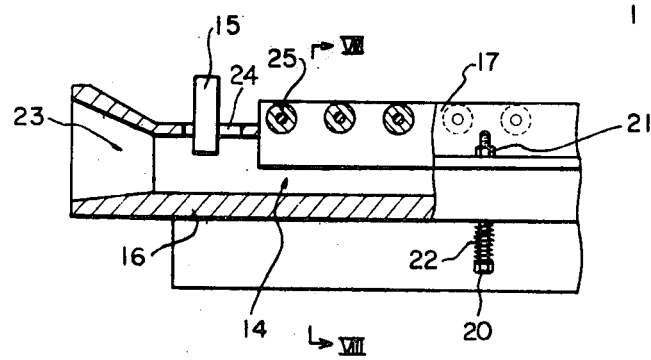
FIG. 7 is a side elevation partly broken away showing another embodiment of the restricted space defining means.
Figure 8:
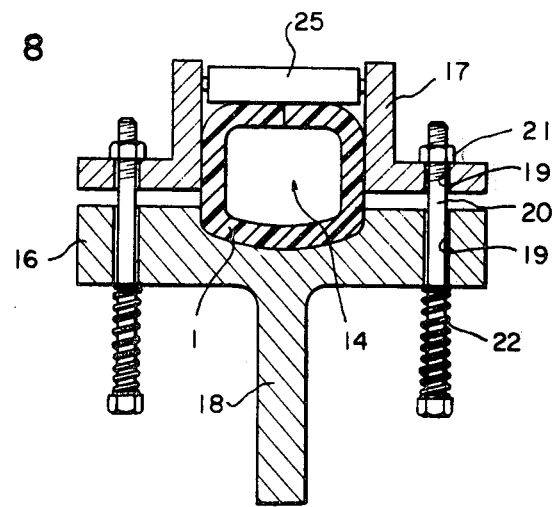
FIG. 8 is a view in section taken along the line VIII—VIII in FIG. 7.

In order to reduce the frictional resistance between the pressing members 16, 17 and the strip 1 passing through the restricted space 14 and to thereby decrease the tension of the strip 1, the present apparatus preferably includes the following means:

a. The members 16 and 17 have strip-contacting surfaces which are made of synthetic resin of low frictional resistance, such as fluorine-containing resin or silicone resin.

b. As shown in FIGS. 7 and 8, the movable pressing member 17 is provided with idle rollers 25 for pressing the strip 1. In these figures, the parts having the same construction and/or function as in the foregoing embodiment are referred to by like reference numerals and the description thereof is omitted.

c. The members 16 and 17, for example, are made of sintered metal having many continuous pores to provide flow passages communicating with the restricted space 14 so that air, water or like fluid is forced against the outer surface of the strip 1 in the restricted space 14. As a result, the strip can be advantageously cooled simultaneously with the application of the fluid pressure.

Although the restricted space 14 according to the foregoing embodiments has a sufficient length in the direction of the travel of the strip 1 to join the lateral surfaces 1a and 1b of the strip and to shape the strip, shaping means of the aircooled or water-cooled type may alternatively be provided independently of the restricted space 14.

What we claim is:

1. An apparatus for producing a synthetic resin tube comprising feed means for transporting a strip of synthetic resin having laterally disposed edges in a longitudinal direction, means for rendering at least one lateral edge of the strip adhesive during transport, and means defining a restricted space for passing the strip therethrough during transport so that the restricted space deforms the strip into a tubular shape having an axis extending in the longitudinal direction of the strip with the laterally disposed confronting edges of the strip being brought into pressing contact with each other to conjoin the said edges, characterized in that the feed means comprises a pulling means for transporting the strip, the means defining the restricted space has a plurality of pressing members arranged along the periphery of the restricted space at least some of which are movable relative to each other diametrically of the said restricted space and wherein said movable members are urged in a direction toward a support member.

2. The apparatus as set forth in claim 1, wherein inner surface portions of the pressing members contacting the strip adjacent to the lateral edges thereof are formed planar so that the lateral edges are brought into pressing contact over the linear extent thereof.

3. The apparatus as set forth in claim 1, wherein a heater element for heating the strip is in sliding contact with at least one lateral edge thereof to render both lateral edges of the strip fusible to each other.

4. The apparatus as set forth in claim 1, wherein means are provided for curving the strip in its transverse direction before the strip is pulled into the restricted space.

5. The apparatus as set forth in claim 1, wherein a cutter is provided downstream of the means defining a restricted space for severing the strip in its resultant tubular shape into suitable lengths.

6. The apparatus as set forth in claim 1, wherein the movable member surrounds approximately the upper half of the tubular strip and the pressing members include a stationary member surrounding approximately the lower half of the strip, the movable member being biased by gravity in the direction of the stationary member.

7. The apparatus as set forth in claim 6, wherein springs act on the movable member to bias the same in the direction of the stationary member.

8. The apparatus as set forth in claim 6, wherein springs act on the movable member to raise the same with a force less than that of gravity acting thereon.

9. The apparatus as set forth in claim 6, wherein means are provided for controlling the biasing force on the movable member.

10. The apparatus as set forth in claim 2, wherein means are provided for reducing the frictional resistance resulting from the sliding contact of the strip with the pressing members.

11. The apparatus as set forth in claim 2, wherien the planar surfaces of the pressing members are made of synthetic resin having low frictional resistance.

12. The apparatus as set forth in claim 10, wherein idle rollers are provided as pressing members.

13. The apparatus as set forth in claim 10, wherein the pressing members have means for forcing a fluid against the strip.

14. The apparatus as set forth in claim 13, wherein the pressing members are made of porous sintered metal to allow a fluid to be forced therethrough against the outer surface of the strip in the restricted space.

15. The apparatus as set forth in claim 4, wherein the curving means comprises a pipe and idle rollers to be brought into contact with both lateral edges of the strip in the pipe.

16. The apparatus as set forth in claim 1, wherein said strip is heated to a plasticizable temperature, is subsequently pulled through the restricted space to urge the softened material into contact and means are provided for shaping the resultant tube by cooling.

17. The appratus as set forth in claim 16, wherein one of the pressing members has slots for cooling the strip in the restricted space with air.

18. An apparatus for producing a tube of thermoplastic synthetic resin comprising, feed means for feeding a strip of thermoplastic synthetic resin, pulling means for transporting said strip said from said feed means in a longitudinal direction, and means defining a restricted space disposed between said feed means and said pulling means for passing the strip therethrough during transport so that the restricted space deforms the strip into a tubular shape having an axis extending in the longitudinal direction of the strip with the laterally disposed confronting edges of the strip being brought into pressing contact with each other to conjoin the said surfaces, said means defining the restricted space having a plurality of pressing members arranged along the periphery of the restricted space at least some of which are movable relative to each other diametically of the said restricted space and wherein said movable members are urged in a direction toward a supporting member, said pressing members including planar inner surface portions to contact portions of the strip adjacent to the lateral edges thereof, said means defining the restricted space being further provided with a heater disposed adjacent to an inlet side thereof in sliding contact with at least one lateral edge of the strip to render both lateral edges of the strip fusible to each other, and cooling means downstream of said heater for cooling the lateral edges of the strip after fusing, whereby a strip of thermoplastic synthetic resin is formed into a tube with a strong butting seam while passing through the restricted space.

* * * * *